(12) United States Patent
Ljøsne

(10) Patent No.: US 12,091,129 B2
(45) Date of Patent: Sep. 17, 2024

(54) HYDRAULIC ONE-FINGER TWO-WAY ACTING GEAR SHIFT OPERATOR

(71) Applicant: Mont Invest 30 AS, Oslo (NO)

(72) Inventor: Knut Tore Ljøsne, Lom (NO)

(73) Assignee: Mont Invest 30 AS, Oslo (NO)

( * ) Notice: Subject to any disclaimer, the term of this patent is extended or adjusted under 35 U.S.C. 154(b) by 60 days.

(21) Appl. No.: 17/793,502

(22) PCT Filed: Jan. 27, 2021

(86) PCT No.: PCT/NO2021/050021
§ 371 (c)(1),
(2) Date: Jul. 18, 2022

(87) PCT Pub. No.: WO2021/158117
PCT Pub. Date: Aug. 12, 2021

(65) Prior Publication Data
US 2023/0040612 A1    Feb. 9, 2023

(30) Foreign Application Priority Data
Feb. 7, 2020   (NO) .................................... 20200160

(51) Int. Cl.
*B62M 25/08*    (2006.01)
*B62K 23/06*    (2006.01)

(52) U.S. Cl.
CPC ............ *B62M 25/08* (2013.01); *B62K 23/06* (2013.01)

(58) Field of Classification Search
CPC ......... B62M 25/08; B62K 23/06; B62K 23/02
See application file for complete search history.

(56) References Cited

U.S. PATENT DOCUMENTS

| | | | |
|---|---|---|---|
| 3,742,777 A | 7/1973 | Mathauser | |
| 5,655,982 A | 8/1997 | Fyfe | |
| 6,305,237 B1 * | 10/2001 | Ichida | B62M 9/122 74/473.11 |
| 6,325,733 B1 | 12/2001 | Patterson et al. | |

(Continued)

FOREIGN PATENT DOCUMENTS

| DE | 29703512 U1 | 5/1997 |
|---|---|---|
| DE | 202014001738 U1 | 5/2015 |

(Continued)

OTHER PUBLICATIONS

International Search Report, issued in PCT/NO2021/050021, PCT/ISA/210, dated Apr. 6, 2021.

(Continued)

*Primary Examiner* — Thomas E Lazo
(74) *Attorney, Agent, or Firm* — Birch, Stewart, Kolasch & Birch, LLP

(57) ABSTRACT

A hydraulic one-finger two-way acting gear shift operator for a handlebar includes a housing with first and second cylinder chambers, a first and a second piston with first and second piston rods arranged in the first and second cylinder chambers, a first and a second lever arranged to independently push the first and second piston rods and corresponding pistons longitudinally inside the first and second cylinder chambers, wherein the first and second levers are connected to the housing in first and second pivot points, respectively.

12 Claims, 4 Drawing Sheets

(56) References Cited

U.S. PATENT DOCUMENTS 8,056,467 B2 * 11/2011 Shahana ................ B62M 9/122
                                                                                  92/128
2009/0200716 A1    8/2009 Shahana
2013/0174543 A1 * 7/2013 Nago .................... B60T 11/203
                                                                                  60/562

FOREIGN PATENT DOCUMENTS

DE      102018101752 A1 * 8/2019
WO    WO-2017149396 A2 * 9/2017 ............ B62M 11/04

OTHER PUBLICATIONS

Written Opinion of the International Searching Authority, issued in PCT/NO2021/050021, PCT/ISA/237. dated Apr. 6, 2021.

* cited by examiner

US 12,091,129 B2

HYDRAULIC ONE-FINGER TWO-WAY ACTING GEAR SHIFT OPERATOR

TECHNICAL FIELD

The present invention relates to a two-way acting hydraulic gear shift operator, where up-and down shifting is configured to be operated by the same finger. The gear shift operator will typically be arranged on a handlebar of a vehicle comprising a complementary shift actuator connected to a gear system of the vehicle, such as e.g. pedally propelled vehicles, motor driven vehicles, or a combination of the two such as bicycles with integrated electric motor. Further, the gear shift operator may as well be used on other vehicles with a handlebar and more than two wheels, such as e.g. vehicles for transport cycling or All Terrain Vehicles (ATVs).

BACKGROUND

Two-way gear units shifted by reciprocating twist-operators are well known. They have an incoming spool for collecting wire, an actuator with a corresponding spool, and twin cable transfer devices with an inner wire stretching from the operator to the actuator and back to said operator again. As wire is pulled from the actuator and collected onto the operator spool, wire is released from the operator and collected onto the actuator spool. Shift torque can be adjusted during shifting. However, twin wire systems are weighty, hard to adjust and to operate, high maintenance, and wide bodied.

WO2017149396A2 discloses a pair of separate gear operators in the form of separate control cylinders for a two-way hydraulic gear actuator, respectively mounted on the left and right handlebars. Each control cylinder defines a working chamber filled with working fluid. A piston or plunger is slidably mounted in each cylinder, sealingly engaging interior walls of the working chambers, so that the volume of each working chamber is variable by sliding of the associated plunger.

WO2017149396A2 further discloses a gear shift actuator that may be used with the present gear shift operator.

However, the solutions above are not always easy to operate. In a number of situations it would be desirable to have a one-hand hydraulic shift operator with improved ergonomic features to allow swift up- and down gearing, preferably with the thumb only.

Further, active two-way operation, instead of one-way operation with spring return is desirable in order to improve shifting response under different operating conditions.

SHORT SUMMARY

The present invention is a hydraulic one-finger two-way acting gear shift operator for a handlebar according to independent claim 1, allowing active two-way operation of a connected hydraulic gear actuator with only one finger.

The improved ergonomy of the gear shift operator over prior art may under certain conditions improve the riders performance and reduce fatigue.

In fact, the disclosed geometry allows the rider to shift gears, both up and down, by pushing in the direction of a regular thumb movement.

Despite its improved functionality, the gear shift operator is still compact and easy to manufacture. For most vehicles it integrates well with other components, such as brake handles and allows easy routing of hydraulic hoses.

EMBODIMENTS OF THE INVENTION

Figure 1:
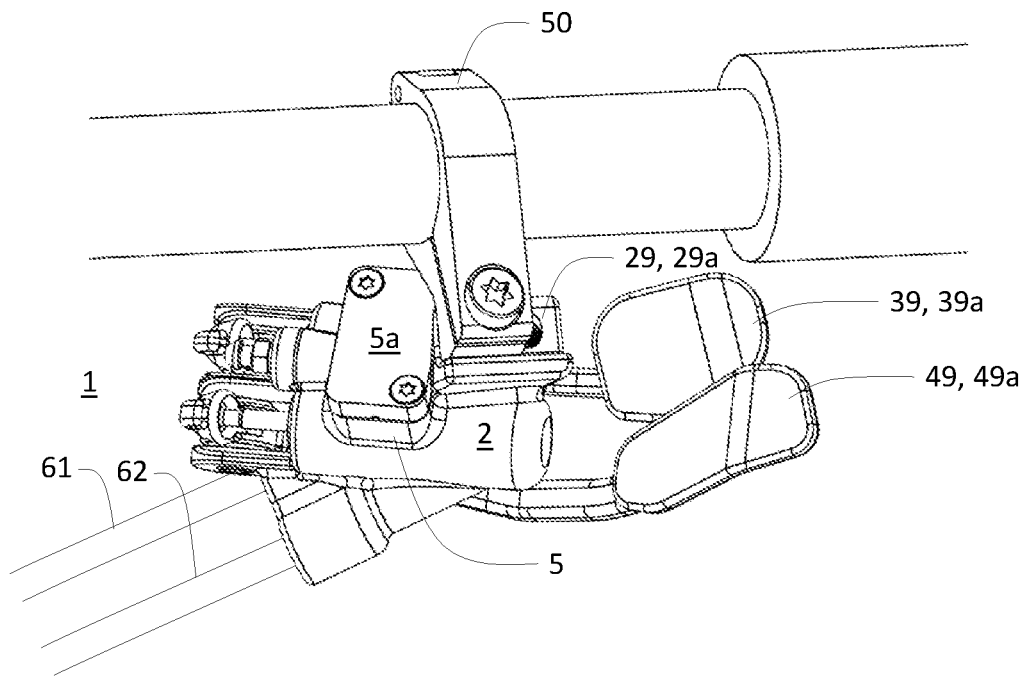
FIG. 1 illustrates an embodiment of the hydraulic one-finger gear shift operator (1). The shift operator housing (2) is here secured to the right side of a handlebar of a vehicle, such as a bicycle, with a bracket (50). First and second hydraulic hoses (61, 62) interconnects the shift operator (1) with a two-way gear shift actuator.

In the following description, various examples and embodiments of the invention are set forth in order to provide the skilled person with a more thorough understanding of the invention. The specific details described in the context of the various embodiments and with reference to the attached drawings are not intended to be construed as limitations. Rather, the scope of the invention is defined in the appended claims.

The embodiments described below are numbered. In addition, dependent embodiments defined in relation to the numbered embodiments are described. Unless otherwise specified, any embodiment that can be combined with one or more numbered embodiments may also be combined directly with any of the dependent embodiments of the numbered embodiment(s) referred to.

In a first embodiment the invention is a hydraulic one-finger two-way acting gear shift operator (1) for a handlebar comprising a housing (2) comprising first and second cylinder chambers (3, 4).

The housing (2) further comprises a first and a second piston (31, 41) with first and second piston rods (32, 42) arranged in the first and second cylinder chambers (3,4), where the first and second piston rods (32, 42) extend through a first end (3a, 4a) of said first and second cylinder chambers, respectively, and a first and a second lever (39, 49) arranged to independently push the first and second piston rods (32, 42) and corresponding pistons (31, 41) longitudinally inside the first and second cylinder chambers (3, 4).

The first and second levers (39, 49) are connected to the housing (2) in first and second pivot points (38, 48), respectively.

Figure 3A:
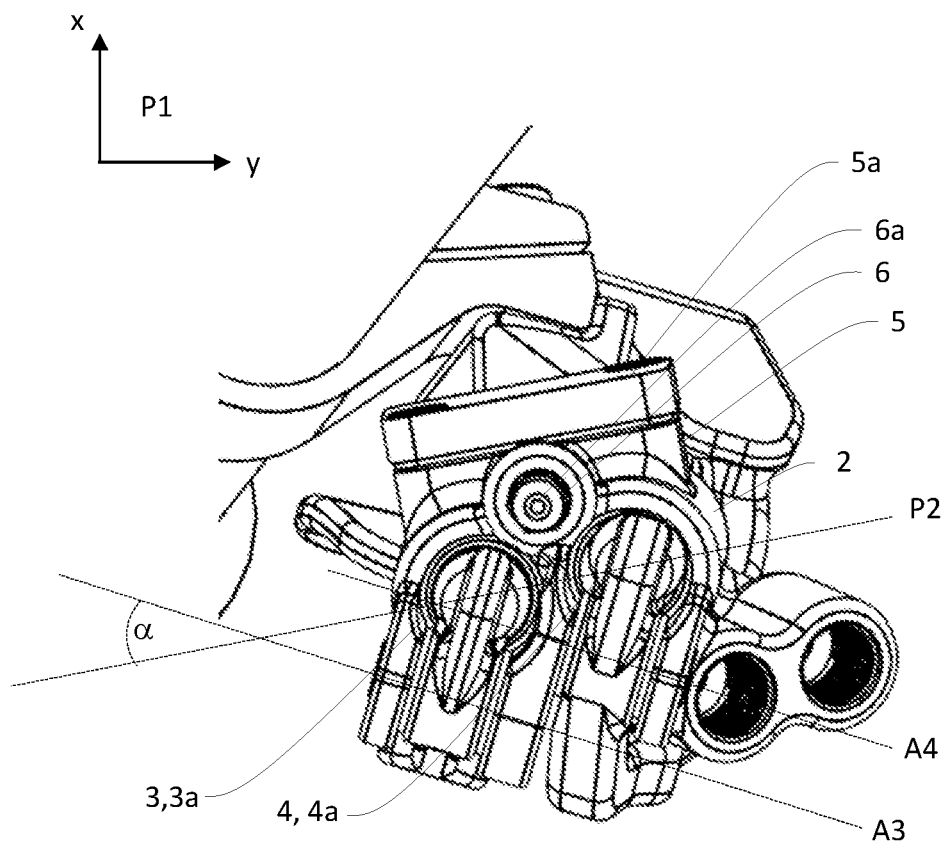
FIG. 3a illustrates the same embodiment as in FIG. 1, seen mainly from the first ends (3a, 4a), with the first and second push pads (39a, 49a) partly hidden behind the housing (2).

The longitudinal directions and the radial centers of the first and second cylinders (3, 4) define a second plane (P2), as can be seen in FIG. 3a.

In a first dependent embodiment, the first and second levers (39, 49) are curved around the housing (2).

In a second embodiment that may be combined with the first embodiment, the first and second levers (39, 49) comprise respective first and second push pads (39a, 49a) and first and second push ends (39b, 49b), wherein the push ends (39b, 49b) are configured to push the first and second piston rods (32, 42) into the first and second cylinder chambers (3, 4) when pressure is applied to the first and second push pads (39a, 49a), respectively, wherein the pivot points (38, 48) are arranged between the first and second push pads (39a, 49a) and the first and second push ends (39b, 49b), respectively.

In a third embodiment that may be combined with the first or second embodiment, the first and second levers (39, 49) are configured to pivot about first and second pivot axis (A3, A4) in the first and second pivot points (38, 48).

In a first dependent embodiment the first and second pivot axis (A3, A4) are arranged perpendicular to the longitudinal direction of the first and second cylinder chambers (3, 4), respectively.

In a second dependent embodiment, that may be combined with the first dependent embodiment, the first and second pivot axis (A3, A4) are arranged in a common first plane perpendicular to the longitudinal direction of the first and second cylinder chambers (3, 4).

In a third dependent embodiment, that may be combined with the second dependent embodiment, the first and second pivot axis (A3, A4) are arranged in parallel and not coinciding in the first plane.

The distance between the first and second pivot axis (A3, A4) in the first plane may in an embodiment be minimum 2 mm.

The first plane (P1) may be seen as the plane defined by the x and y coordinates in FIG. 3a, where the z direction is inwards in the longitudinal direction of the first and second cylinder chambers (3, 4).

In a fourth dependent embodiment, that may be combined with any of the first to third dependent embodiment, the first and second pivot axis (A3, A4) intersect, in different points, the second plane (P2).

The first and second pivot axis (A3, A4) may intersect the second plane (P2) at an angle ($\alpha$) between 5 and 50 degree or more optionally between 22 and 32 degree.

In a fourth embodiment that may be combined with any of the embodiments above, the hydraulic one-finger gear shift operator comprises a fluid chamber (5) arranged opposite the first and second levers (39, 49) with regard to the first and second cylinder chambers (3, 4), wherein the fluid chamber (5) is configured to support fluid to both the first and the second cylinders (3, 4).

In a first dependent embodiment, the housing (2) comprises a bleeder channel (6) extending through a wall of the fluid chamber (5) in the direction of the first ends (3a, 4a) of the first and second cylinder chambers (3, 4), wherein the bleeder channel (6) comprises a bleeder valve (6a).

In a second dependent embodiment that may be combined with the first dependent embodiment, an inner end of the bleeder channel (6) is in fluid communication with a lower part of the fluid chamber (5), wherein the lower part is the part of the fluid chamber (5) closest to the second plane (P2).

In a third dependent embodiment, that may be combined with the first or second dependent embodiment, the bleeder channel (6) is arranged equidistant from the first and second cylinder chambers (3, 4).

In a fourth dependent embodiment, that may be combined with any of the dependent embodiments above, the fluid chamber has a lid (5a).

In a fifth dependent embodiment, that may be combined with any of the dependent embodiments above, the wall thicknesses between the bleeder channel and the first and second cylinder chambers (3, 4), respectively, are within +/−30% of the width of the wall thickness between the first and second cylinder chambers (3, 4).

In a fifth embodiment that may be combined with any of the embodiments above, the housing (2) comprises first and second fluid outlets (37, 47) in second ends (3b, 4b) of the first and second cylinder chambers (3, 4), opposite the first ends (3a, 4a), respectively.

In a first dependent embodiment, the housing (2) comprises first and second outlet channels (36, 46), extending from the in first and second fluid outlets (37, 47) in the direction of the first ends (3a, 4a) with increasing distance from their respective cylinder chambers (3, 4) and the second plane (P2).

In a second dependent embodiment, that may be combined with the first dependent embodiment above, the first and second outlet channels (36, 46) are arranged opposite the second plane (P2) with regard to the fluid chamber (5).

In a third dependent embodiment, that may be combined with the first or second dependent embodiment above, each of the first and second outlet channels (36, 46) are terminated with an inner thread configured for attaching hydraulic tubes with hydraulic tube joints in the ends opposite the first and second fluid outlets (37, 47).

In a fourth dependent embodiment, that may be combined with any of the dependent embodiments above, the first outlet channel (36) is arranged between the second cylinder chamber (4) and the second lever (49). As can be seen from the illustrations, the first outlet channel (36), crosses the second cylinder chamber (4) and the second lever (49).

In a fifth dependent embodiment, that may be combined with any of the dependent embodiments above, the first and second outlet channels (36, 46) are straight.

Figure 6:
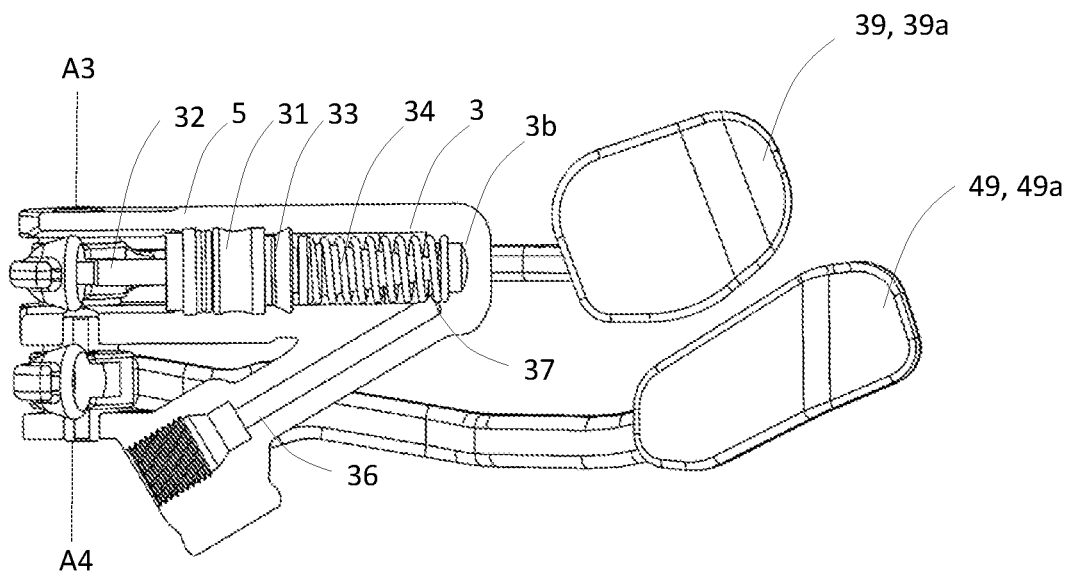
FIGS. 6 and 7 illustrate two different cross sections of the embodiment in FIG. 1.
Figure 7:
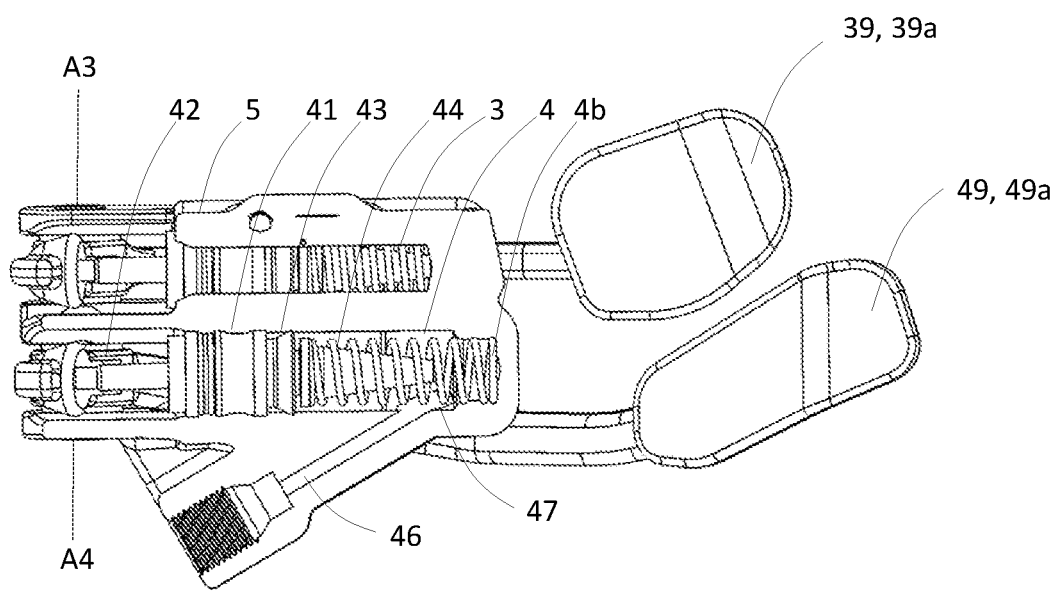

The latter allows easy machining of the outlet channels (36, 46) as can be seen from FIGS. 6 and 7, since they may be realized by a single bore.

In a sixth embodiment that may be combined with any of the embodiments above, the hydraulic one-finger gear shift operator comprises first and second resilient elements (34, 44) configured to force the first and second pistons (31, 41) towards the first ends (3a, 4a), respectively.

Figure 4:
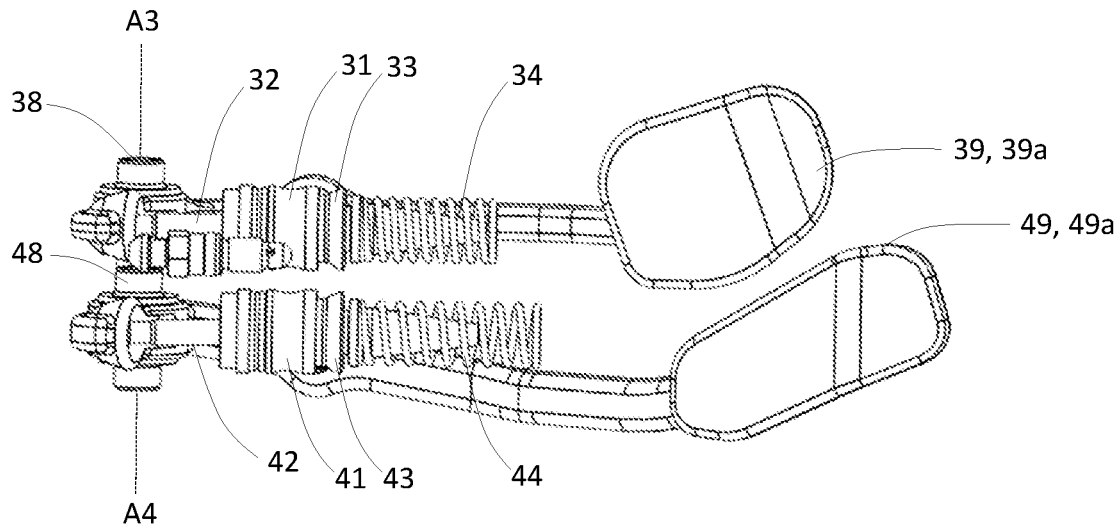
FIG. 4 illustrate the same embodiment as in FIG. 1, where the housing has been hidden for illustration purposes.
Figure 5:
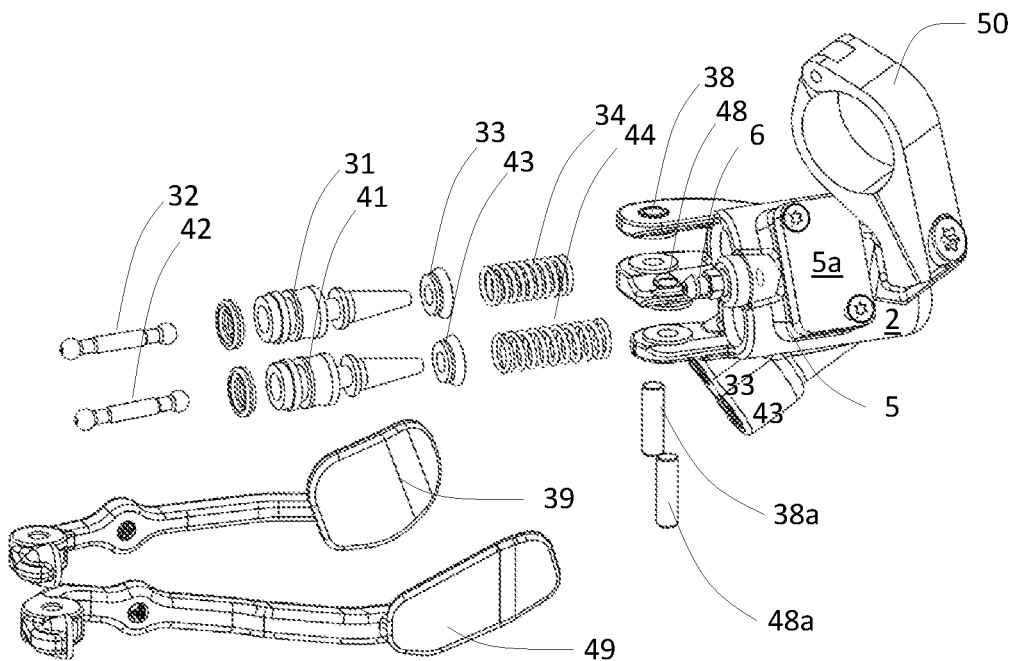
FIG. 5 illustrate the same embodiment as in FIG. 4 in an exploded view. In addition the housing (2) and the bracket (50) are shown.

The resilient elements may be e.g. coil springs as illustrated in FIGS. 4 and 5.

In a first dependent embodiment the hydraulic one-finger gear shift operator comprises first and second seals (33, 43) fixed to seal grooves in the first and second pistons (31, 41), respectively.

The first and second seals may be e.g. lip seals or U-cup seals.

In a second dependent embodiment the first and second pistons (31, 41) have a tapered cross section in the direction opposite the respective piston rods (32, 42).

The tapered parts may be shaped as a cone or frustum.

The tapered end of the first and second pistons (31, 41) may be configured to limit the displacement of the first and second pistons (31, 41) into the respective first and second cylinders (3, 4).

In a seventh embodiment, that may be combined with any of the embodiments above, the first and second piston rods (32, 42) are configured to pivot relative the first and second pistons (31, 41) and the first and second levers (39, 49), respectively, during longitudinal movement of the first and second pistons (31, 41) in the first and second cylinder chambers (3, 4).

In a first dependent embodiment both ends of the first and second piston rods (32, 42) are rounded and the corresponding interfacing ends of the first and second pistons (31, 41) and the first and second levers (39, 49), respectively, are cup-shaped.

The cups of the first and second levers (39, 49) may be facing the first ends (3a, 4a) of the first and second cylinders chambers (3, 4).

In an eight embodiment that may be combined with any of the embodiments above, the second cylinder chamber (4) is longer than the first cylinder chamber (3). This allows a longer travel of the second piston (41) and more fluid to be displaced than for the first cylinder chamber (3). A longer cylinder chamber therefore allows multiple gear shifts, as long as this is supported by the interfacing shift actuator.

In a first dependent embodiment, the first lever (39) and the first cylinder chamber (3) may be used for shifting to higher gears and the second lever (49) and the second cylinder chamber (4) may be used for shifting to lower gears. Multiple lower gears can be shifted sequentially in a single movement of the second lever (49), since less force is required to shift down than up.

In a second dependent embodiment, that may be combined with the first dependent embodiment above, the second lever (49) is longer than the first lever (39).

In a ninth embodiment that may be combined with any of the embodiments above, the hydraulic one-finger gear shift operator (1) comprises a fastening element (29) configured to be fastened to a bracket (50) fixed to the handlebar, wherein the fastening element is protruding from the housing (2) on the same side of the second plane (P2) as the fluid chamber (5).

In a first dependent embodiment, the fastening element (29) is arranged opposite the first ends (3a, 4a) with regard to the fluid chamber (5).

In a second dependent embodiment, that may be combined with the first dependent embodiment above, the fastening element (29) is an integrated part of the housing (2).

In a fourth dependent embodiment, that may be combined with any of the dependent embodiments above, the bracket (50) is a brake handle bracket fixed to the handlebar.

In a fifth dependent embodiment, that may be combined with any of the dependent embodiments above, the fastening element (29) comprises at least two bores for flexible placement of the gear shift operator (1) with regard to the bracket.

In a sixth dependent embodiment, that may be combined with any of the dependent embodiments above, the fastening element (29) comprises first and second non-parallel surfaces (29a, 29b), wherein the second surface is configured to interface and lock the gear shift operator (1) with regard to the bracket (50) in two dimensions.

In the third dimension the gear shift operator (1) may be locket to the bracket (50) by clamping the bracket (50) to the first surface with a fastening device, such as a screw, as illustrated e.g. in FIG. 1.

This gives freedom to adjust the gear shift operator individually for each rider by moving the operator along the handlebar, and/or rotating or tilting it relative to the handlebar.

The disclosed geometry allows the operating direction of the first and second pads (39a, 49a) to follow the natural direction of the thumb.

In the drawings a right hand gear shift operator has been illustrated. However, the operator may as well be left-hand and arranged for being fixed to the left end of a handlebar. In this case the entire operator may be mirrored.

In the following, the specific embodiment illustrated in the figures will be explained.

FIG. 1 illustrates an embodiment of the hydraulic one-finger, two-way acting, gear shift operator (1). The shift operator housing (2) is here secured to the right side of a handlebar of a vehicle, such as a bicycle, with a bracket (50). First and second hydraulic hoses (61, 62) interconnects the shift operator (1) with a two-way gear shift actuator. A push on the first push pad (39a) of the first lever (39) will result in an increased pressure in the first hydraulic hose (61), and a push on the second push pad (49a) of the second lever (49) will result in an increased pressure in the second hydraulic hose (61). Both the first and the second push pads may easily be operated by the right thumb.

Figure 2:
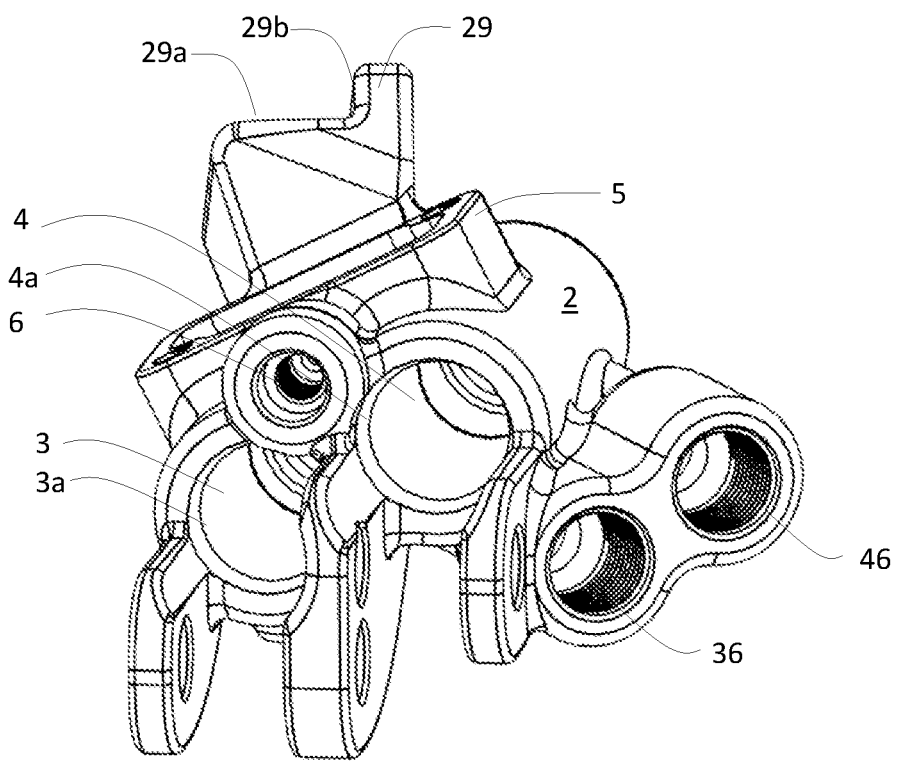
FIG. 2 illustrates the housing (2) of the gear shift operator in FIG. 1 without any internal or external parts, seen mainly from the first ends (3a, 3b) of the first and second cylinder chambers (3, 4).

FIG. 2 illustrates the housing (2) of the gear shift operator in FIG. 1 without any internal or external parts, seen mainly from the first ends (3a, 3b) of the first and second cylinder chambers (3, 4), where the pistons can be entered into the housing. The bleeder channel (6) and the first and second outlet channels (36, 46) with internal threads for interconnection with hydraulic hose fittings, are also seen in this figure.

FIG. 3a illustrates the same embodiment as in FIG. 1, seen mainly from the first ends (3a, 4a), with the first and second push pads (39a, 49a) partly hidden behind the housing (2). A second plane (P2) defined by the longitudinal directions and the radial centers of the first and second cylinders (3, 4) is illustrated perpendicular to this view. Further, it can be seen that the first and second levers pivot about first and second parallel pivot axis (A3, A4). In this view the axis do not coincide, but enter into the second plane (P2) in two different locations with the same angle of incidence (a) with regard to the second plane (P2).

Figure 3B:
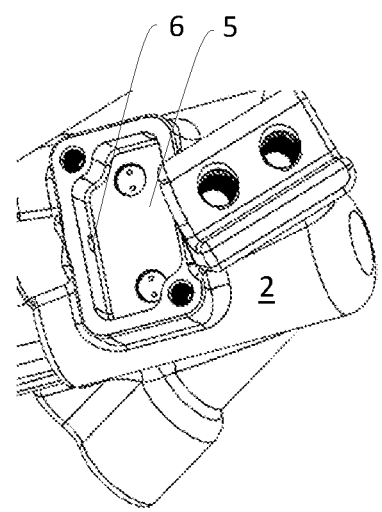
FIG. 3b shows details of the fluid chamber (5).

FIG. 3b shows details of the fluid chamber (5). The bleeder channel (6) extends through the wall of the fluid chamber (5). It can also be seen that there is a fluid passage from the floor of the fluid chamber (5) to each of the first and second cylinder chambers (3, 4) to allow continuous supply of fluid to the two chambers.

FIG. 4 illustrate the same embodiment as in FIG. 1, where the housing has been hidden for illustration purposes. The first and second axis (A3, A4) are stationary with respect to the housing and when the first or second push pad (39a, 49a) is pushed inward in the illustration, the corresponding first or second lever (39, 49) will pivot about the respective first or second pivot axis (A3, A4), which in the present view are colinear. Further, the cup of the second end of the first or second lever (39, 49) will push the respective first or second piston rod (32, 42) in the direction towards the respective first or second push pad (39a, 49a). This is also the direction into the respective first or second cylinder chambers that are part of the hidden housing. The first or second piston rod (32, 42) pushes on the respective first or second piston (31, 41). This will create a fluid pressure in the respective first or second cylinder chamber that will propagate to the respective first or second hydraulic hose (61, 62) and the gear shift actuator via the respective first or second outlet channel (36, 46).

FIG. 5 illustrates the same embodiment as in FIG. 4 in an exploded view. In addition the housing (2) and the bracket (50) are shown.

When the rider releases the pressure on the respective first or second push pad (39a, 49a), the first and second coil springs (34, 44) will return the respective piston and lever to its initial position. The initial positions can in this case be adjusted by optional set screws in the first and second levers (39, 49) wherein threaded bores in the first and second levers (39, 49) for the set screws can be seen in FIG. 5. The end of the set screw will then abut the housing (2).

It can be seen that the first and second piston rods (32 and 42) are both ball shaped in the end. The ball shaped ends interface cup shapes in the respective ends of the first and second levers and in the first and second pistons (31, 41).

The present configuration allows easy assembling of the gear shift operator. Starting by entering the coil springs into the cylinder chambers, then the pistons and the piston rods before mounting the levers to the housing with the first and second pins (38a, 48a) in the pivot points (38, 48). Mounting the levers secures all the mentioned components inside the cylinder chambers.

FIGS. 6 and 7 illustrate two different cross sections of the embodiment in FIG. 1.

FIG. 6 illustrates in a cross section view through the middle of the first cylinder chamber (3) and the middle of the first output channel (36), how fluid in the first cylinder chamber (3) is pushed into the first output channel (36) when the first push pad (39a) is pushed inwards and the first lever (39) pivots about the first axis (A3). The first lever (39) then pushes the first piston rod (32) and the first piston (31) into the first cylinder chamber (3).

FIG. 7 illustrates in a cross section view through the middle of the second cylinder chamber (4) and the middle of the second output channel (46), how fluid in the second cylinder chamber (4) is pushed into the first output channel (46) when the first push pad (49a) is pushed inwards and the first lever (49) pivots about the second axis (A4). The second lever (49) then pushes the second piston rod (42) and the second piston (41) into the second cylinder chamber (4).

From FIGS. 6 and 7, it can be seen that the first output channel (36) is arranged between the second cylinder chamber (46) and the second lever (49), while the first and second cylinder chambers (3, 4) are arranged between the fluid chamber (5) and the first and second output channels (36, 46).

By operating any of the push pads, hydraulic fluid from the first or second cylinder chambers (3, 4) is pushed into the respective first or second hydraulic hose (61, 62) and further to the hydraulic gear shift actuator. Since hydraulic pressure is applied both for up-and downshift, the hydraulic one-finger gear shift operator (1) is a two-way acting operator. This ensures safe shifting both up and down.

In the exemplary embodiments, various features and details are shown in combination. The fact that several features are described with respect to a particular example should not be construed as implying that those features by necessity have to be included together in all embodiments of the invention. Conversely, features that are described with reference to different embodiments should not be construed as mutually exclusive. As those with skill in the art will readily understand, embodiments that incorporate any subset of features described herein and that are not expressly interdependent have been contemplated by the inventor and are part of the intended disclosure. However, explicit description of all such embodiments would not contribute to the understanding of the principles of the invention, and consequently some permutations of features have been omitted for the sake of simplicity or brevity.

The invention claimed is:

1. A hydraulic one-finger two-way acting gear shift operator for a handlebar comprising:
a housing comprising first and second cylinder chambers;
a first and a second piston with first and second piston rods arranged in the first and second cylinder chambers, where the first and second piston rods extend through a first end of said first and second cylinder chambers, respectively; and
a first and a second lever arranged to independently push the first and second piston rods and the corresponding first and second pistons longitudinally inside the first and second cylinder chambers, wherein the first and second levers are connected to the housing in first and second pivot points, respectively,
wherein the housing comprises first and second fluid outlets in second ends of the first and second cylinder chambers, opposite the first ends, respectively, and
wherein the housing comprises first and second outlet channels, extending from the first and second fluid outlets, respectively in the direction of the first ends with increasing distance from their respective cylinder chambers and a second plane, wherein the second plane is defined by the longitudinal directions and the radial centres of the first and second cylinders.

2. The gear shift operator of claim 1, wherein the first and second levers comprise respective first and second push pads and first and second push ends, wherein the push ends are configured to push the first and second piston rods into the first and second cylinder chambers when pressure is applied to the first and second push pads, respectively, wherein the pivot points are arranged between the first and second push pads and the first and second push ends, respectively.

3. The gear shift operator of claim 2, wherein the first and second levers are configured to pivot about first and second pivot axes in the first and second pivot points, wherein the first and second pivot axes are arranged perpendicular to the longitudinal direction of the first and second cylinder chambers, respectively.

4. The gear shift operator of claim 2, comprising a fluid chamber arranged opposite the first and second levers with regard to the first and second cylinder chambers, wherein the fluid chamber is configured to support fluid to both the first and the second cylinders.

5. The gear shift operator of claim 1, wherein the first and second levers are configured to pivot about first and second pivot axes in the first and second pivot points, wherein the first and second pivot axes are arranged perpendicular to the longitudinal direction of the first and second cylinder chambers, respectively.

6. The gear shift operator of claim 5, wherein the first and second pivot axes are arranged in a common first plane perpendicular to the longitudinal direction of the first and second cylinder chambers.

7. The gear shift operator of claim 6, comprising a fluid chamber arranged opposite the first and second levers with regard to the first and second cylinder chambers, wherein the fluid chamber is configured to support fluid to both the first and the second cylinders.

8. The gear shift operator of claim 5, comprising a fluid chamber arranged opposite the first and second levers with regard to the first and second cylinder chambers, wherein the fluid chamber is configured to support fluid to both the first and the second cylinders.

9. The gear shift operator of claim 1, comprising a fluid chamber arranged opposite the first and second levers with regard to the first and second cylinder chambers, wherein the fluid chamber is configured to support fluid to both the first and the second cylinders.

10. The gear shift operator of claim 9, wherein the housing comprises a bleeder channel extending through a wall of the fluid chamber in the direction of the first ends of the first and second cylinder chambers, wherein the bleeder channel comprises a bleeder valve.

11. The gear shift operator of claim 10, wherein the wall thicknesses between the bleeder channel and the first and second cylinder chambers, respectively, are within +/−30% of the width of the wall thickness between the first and second cylinder chambers.

12. The gear shift operator of claim 1, wherein the first outlet channel is arranged between the second cylinder chamber and the second lever.

* * * * *